UNITED STATES PATENT OFFICE.

ELDON L. LARISON, OF ANACONDA, MONTANA, ASSIGNOR TO ANACONDA COPPER MINING COMPANY, OF ANACONDA, MONTANA.

PROCESS FOR THE MANUFACTURE OF PHOSPHATE FERTILIZERS.

No Drawing.　　　Application filed March 24, 1926.　Serial No. 97,110.

The phosphoric acid contained in phosphate rock is so combined with calcium as to be very slowly available for use as a plant food. It is customary to render it quickly and easily available by treating the rock with either sulphuric or orthophosphoric acid.

The reactions are as follows:—

(1) $Ca_3(PO_4)_2 + 2H_2SO_4 + 5H_2O = CaH_4(PO_4)_2.H_2O + 2CaSO_4.2H_2O$ (2) $Ca_3(PO_4)_2 + 4H_3PO_4 + 3H_2O = 3CaH_4(PO_4)_2.H_2O$

It has been found in practice that by mixing together substantially equal parts by weight of finely ground phosphate rock and 52° Bé. sulphuric acid, a pulp or slurry is produced which can be well and thoroughly stirred and mixed into a homogeneous mass. Such a mixture will within a few hours "set" into a damp solid. If this solid be broken up and piled and allowed to stand for a few weeks its mechanical condition becomes such that it can be disintegrated into a granular powder suitable for application to the soil through fertilizer distributing machinery.

The water which was present in the 52° acid to some extent evaporates during the mixing and subsequent aging, but is chiefly consumed as water of crystallization by the two salts specified in reaction No. 1 above.

The $CaSO_4.2H_2O$ plainly consumes the larger quantity.

The product of the above described process is called acid phosphate and contains normally from 16 to 18% of available $P_2O_5$.

It is obvious from an inspection of the reactions shown that by mixing phosphate rock and orthophosphoric acid a product containing a much higher percentage of available $P_2O_5$ can be obtained. From a mechanical standpoint, however, the process is less simple than that in which sulphuric acid is used.

It has been found that in order to make a pulp or slurry of ground rock and phosphoric acid which is sufficiently thin and mobile and slow setting that it may be thoroughly mixed to a homogeneous mass, the phosphoric acid used should contain not more than about 45% $P_2O_5$. Such a mixture will "set" within a short time but will contain about 20% of water. If the mass be piled and allowed to stand for several weeks it will still contain about 16 or 17% water.

In order to render it fit mechanically to be ground to a granular powder and to later be distributed through fertilizer machinery it is necessary to dry it by artificial heat until its moisture content is reduced to about 4% or less. This is an operation which is expensive and delicate as mono-calcium phosphate is easily decomposed at a comparatively low temperature.

The chief reason of course for the difference in the behavior of the product made with sulphuric acid and that made with phosphoric acid is that in the latter there is no $CaSO_4.2H_2O$ to consume the water as water of crystallization.

The product made with phosphoric acid and phosphate rock often called double superphosphate, contains 40 to 50% available phosphoric acid.

I have found that by using certain mixtures of sulphuric acid, phosphoric acid and ground phosphate rock I am able to produce materials containing much higher percentages of available phosphoric acid than can be made when using sulphuric acid alone, and which at the same time after the usual aging period, become mechanically fit to be readily disintegrated and distributed upon the soil without the expensive and delicate drying operation.

I have found for example that by mixing substantially one part of 43% $P_2O_5$ phosphoric acid, two parts of 60° Bé. sulphuric acid and three parts of ground phosphate rock, allowing the mixture to "set," piling it and allowing it to stand for about four to six weeks a material results which contains about 24.5% available $P_2O_5$. This material without further drying can be easily disintegrated into a granular powder and later distributed through fertilizer machinery.

The wet pulps formed by the above mentioned and other properly proportioned mixtures are sufficiently thin and mobile to be readily mixed to homogeneous masses before setting takes place.

Other proportions of the two acids and ground phosphate rock may be used within those limits which permit sufficient mobility of the wet mixtures to allow thorough mixing and which contain not more water than that which is disposed of by natural evaporation and as water of crystallization in the compounds formed to such an extent that proper mechanical condition results.

I claim:

1. Process for the manufacture of phosphate fertilizer which comprises mixing ground phosphate rock with sulfuric acid and phosphoric acid in such concentrations, quantities, and relative proportions that a slurry which is sufficiently thin and mobile to be readily mixed is formed and which upon standing without artificial drying will form a mass which is easily disintegrated into a granular powder suitable for use in fertilizer distributing machinery.

2. Process for the manufacture of phosphate fertilizer which comprises mixing about three parts by weight of ground phosphate rock with about two parts by weight of sulfuric acid of about 60° Bé. and about one part by weight of phosphoric acid containing about 43% of $P_2O_5$.

In testimony whereof, I affix my signature.

ELDON L. LARISON.